United States Patent [19]

Neely, Jr. et al.

[11] 4,329,327
[45] May 11, 1982

[54] METHOD FOR MAKING B-FORM ALUMINUM TRIMETAPHOSPHATE FROM POWDER REACTANTS

[75] Inventors: James E. Neely, Jr., Butler; Annette Moff, Latrobe; Chia-Cheng Lin, Gibsonia; Charlene A. Falleroni, Lower Burrell, all of Pa.

[73] Assignee: PPG Industries, Inc., Pittsburgh, Pa.

[21] Appl. No.: 210,480

[22] Filed: Nov. 26, 1980

[51] Int. Cl.³ ............................................. C01B 25/36
[52] U.S. Cl. .................................................. 423/314
[58] Field of Search ....................................... 423/314

[56] References Cited

U.S. PATENT DOCUMENTS 2,266,486  12/1941  Booth ................................. 423/314
4,059,669  11/1977  Thomas .............................. 423/314
4,216,190   8/1980  Neely, Jr. ........................... 423/314

OTHER PUBLICATIONS d'Yvoire, *Study of Trivalent Aluminum and Iron Phosphates v. Long Chain Phosphates and the Metaphosphates*, Bulletin of the Societe, Chemique de France, No. 6, pp. 1237–1243, Jun. 1962.

Tsuhako et al., *Studies of the Preparation and Physical Properties of Multivalent Metal Condensed Phosphates*, Bulletin of the Chemical Society of Japan, vol. 46, pp. 2343–2346, Aug. 1973.

*Primary Examiner*—O. R. Vertiz
*Assistant Examiner*—Wayne A. Langel
*Attorney, Agent, or Firm*—Donna L. Seidel

[57] ABSTRACT

A method for preparing aluminum trimetaphosphate predominately in the B-form by heating a mixture of aluminum hydroxide and ammonium phosphate compound is disclosed.

4 Claims, No Drawings

METHOD FOR MAKING B-FORM ALUMINUM TRIMETAPHOSPHATE FROM POWDER REACTANTS

BACKGROUND OF THE INVENTION

1. Field of the Invention

The present invention relates generally to the art of making $Al(PO_3)_3$ and more particularly to the preparation of the B-form of aluminum trimetaphosphate.

2. The Prior Art

Crystalline condensed aluminum phosphates are described in the literature by D'Yvoire, who identified a cyclic aluminum tetrametaphosphate, the stable A-form of $Al(PO_3)_3$, and four long-chain polyphosphates, the B, C, D and E forms of $Al(PO_3)_3$. According to D'Yvoire, these crystalline condensed aluminum metaphosphates are produced by reacting $P_2O_5$ and $Al_2O_3$ in a molar ratio of 4 to 15 over several hours.

U.S. Pat. No. 4,216,190 to Neely teaches a method for preparing predominantly the B-form of aluminum trimetaphosphate by the addition of an ammonia compound to a solution of aluminum dihydrogen phosphate, $Al(H_2PO_4)_3$. A white precipitate is formed, which is directly converted to the B-form of aluminum trimetaphosphate, $Al(PO_3)_3$, by a single elevated temperature treatment.

In a study of the effects of grinding on the structure and properties of various aluminum phosphates, Tsuhako et al. report mixing α-alumina and ammonium dihydrogen phosphate, and heating at 500° to 550° C. for 20 hours to obtain the B-form of $Al_4(P_4O_{12})_3$.

THE PRESENT INVENTION

The present invention provides a simple method for preparing the B-form of aluminum trimetaphosphate. An aluminum compound capable of reacting with a phosphate compound to form aluminum trimetaphosphate is mixed with a phosphate compound capable of reacting with the aluminum compound to form aluminum trimetaphosphate. Both the aluminum compound and the phosphate compound are preferably in powder form. The mixture is subjected to a single treatment at elevated temperature to yield the B-form of aluminum trimetaphosphate.

DESCRIPTION OF THE PREFERRED EMBODIMENTS

An aluminum compound capable of reacting with a phosphate compound to form, upon heating, the B-form of aluminum trimetaphosphate is mixed with a suitable phosphate compound. A preferred aluminum compound is aluminum hydroxide. The phosphate compound is preferably ammonium phosphate, which may be monobasic or dibasic. Both aluminum hydroxide and ammonium phosphate are readily available in the preferred powder form.

The aluminum hydroxide and ammonium phosphate are mixed together thoroughly, preferably in approximately stoichiometric quantities. Although the dry powders are preferred, the materials may also be combined in an aqueous slurry or even in solution. However, a major advantage of the present invention is the use of dry powder reactants. The blended reactants are then subjected to a single elevated temperature treatment. Heat treatment times and temperatures useful in accordance with the present invention are disclosed in U.S. Pat. No. 4,216,190 to Neely which is incorporated herein by reference. For convenience, a relatively short heat treatment is preferred. Heating for about one hour at a temperature of about 630° to 640° C. is most preferred. The resultant product may be analyzed by X-ray diffraction to determine the yield of the B-form of aluminum trimetaphosphate.

The present invention wil be further understood from the descriptions of specific examples which follow.

EXAMPLE I

A slurry composition is prepared by combining 59.1 grams of aluminum hydroxide and 300 grams of dibasic ammonium phosphate with 150 milliliters of water. The aqueous slurry is blended thoroughly and then heated at a temperature of 630° C. for about one hour. The resultant product contains 89 percent of the B-form of aluminum trimetaphosphate, 8 percent A-form and 3 percent unidentified crystalline species.

EXAMPLE II

A dry powder composition is prepared by thoroughly mixing together 78 grams of aluminum hydroxide and 345 grams of monobasic ammonium phosphate. The mixture is heated at a temperature of 630° C. for about one hour. The resultant product comprises about 98 percent of the B-form of aluminum trimetaphosphate. 1 percent A-form and 1 percent unidentified crystalline species.

EXAMPLE III

A slurry batch is prepared by mixing together the components of EXAMPLE II and adding 273 grams of water. The reacting mixture is heated for one hour and 27 minutes at 634° C. resulting in the production of 96 percent of the B-form of aluminum trimetaphosphate and 4 percent unidentified crystalline species.

EXAMPLE IV

A batch of dry powders is prepared containing 234 grams of aluminum hydroxide and 1188 grams of dibasic ammonium phosphate. The powders are thoroughly mixed by hand before heating. The mixture is heated at a temperature of 636° C. for about one hour and 45 minutes. X-ray diffraction analysis indicates that the product contains 96 percent of the B-form of aluminum trimetaphosphate. The remainder comprises the A-form.

The above examples are offered to illustrate the present invention. Various modifications, such as other heat treatment times and temperatures, varying with batch size, as well as other aluminum and phosphate compounds, are included within the scope of the present invention, which is defined by the following claims.

We claim:

1. A method for making the B-form of aluminum trimetaphosphate comprising the steps of:
   a. thoroughly mixing together aluminum hydroxide and ammonium phosphate in approximately stoichiometric quantities; and
   b. heating the mixture at a temperature of from about 630° to about 640° C. for a sufficient time to obtain aluminum trimetaphosphate in predominantly the B-form.

2. The method according to claim 1, wherein the aluminum hydroxide and ammonium phosphate are mixed as dry powders.

3. The method according to claim 2, wherein the mixture of aluminum hydroxide and ammonium phosphate further comprises water to form an aqueous slurry.

4. The method according to claim 1, wherein the mixture of aluminum hydroxide and ammonium phosphate is heated for about one hour.

* * * * *